United States Patent [19]

Woffinden et al.

[11] Patent Number: 4,625,273
[45] Date of Patent: Nov. 25, 1986

[54] APPARATUS FOR FAST DATA STORAGE WITH DEFERRED ERROR REPORTING

[75] Inventors: Gary A. Woffinden, Scotts Valley; Joseph A. Petolino, Jr., Mountain View, both of Calif.

[73] Assignee: Amdahl Corporation, Sunnyvale, Calif.

[21] Appl. No.: 527,672

[22] Filed: Aug. 30, 1983

[51] Int. Cl.⁴ .............................................. G06F 11/00
[52] U.S. Cl. ...................................... 364/200; 371/38
[58] Field of Search ............................ 371/51, 16, 38; 364/200 MS File, 900 MS File

[56] References Cited

U.S. PATENT DOCUMENTS

| | | | |
|---|---|---|---|
| 3,873,819 | 3/1975 | Greenwald | 371/16 |
| 3,917,933 | 11/1975 | Scheuneman | 364/200 |
| 3,967,247 | 6/1976 | Andersen et al. | 364/200 |
| 4,055,851 | 10/1977 | Jenkins et al. | 364/200 |
| 4,084,236 | 4/1978 | Chelberg et al. | 364/200 |
| 4,166,211 | 8/1979 | York et al. | 371/51 |
| 4,317,168 | 2/1982 | Messina et al. | 364/200 |
| 4,438,512 | 3/1984 | Hartung et al. | 364/900 |
| 4,449,183 | 5/1984 | Flahive et al. | 364/200 |
| 4,471,429 | 9/1984 | Porter et al. | 364/200 |

*Primary Examiner*—David Y. Eng
*Attorney, Agent, or Firm*—Fliesler, Dubb, Meyer & Lovejoy

[57] ABSTRACT

An apparatus for enhancing the speed of access of an execution unit in a data processing machine to the high speed buffer memory array by storing data from the execution unit in the buffer before completing error checking operations.

5 Claims, 3 Drawing Figures

APPARATUS FOR FAST DATA STORAGE WITH DEFERRED ERROR REPORTING

CROSS-REFERENCE TO RELATED APPLICATIONS

VIRTUALLY ADDRESSED CACHE invented by Gene Myron Amdahl, Donald Laverne Hanson and Gary Arthur Woffinden, Ser. No. 527,678, filed Aug. 29, 1983.

APPARATUS FOR STORING DATA WITH DEFERRED UNCORRECTABLE ERROR REPORTING invented by Gary Arthur Woffinden, Joseph Anthony Petolino, Jr., Ser. No. 527,671, filed Aug. 29, 1983.

APPARATUS FOR REDUCING STORAGE NECESSARY FOR ERROR CORRECTION AND DETECTION IN DATA PROCESSING MACHINES invented by Gary Arthur Woffinden and Joseph Anthony Petolino, Jr., Ser. No. 527,677, filed Aug. 29, 1983.

FIELD OF THE INVENTION

Present invention relates to data processing machines. In particular the present invention involves storage of data and error checking in data storage facilities in data processing machines.

BACKGROUND OF THE INVENTION

A typical data processing machine consists of an execution unit for executing instructions and a storage facility for storing the data on which the instructions are executed. One of the most important attributes of a good data processing machine is that the execution unit has fast access to the data which is stored in the storage facility. However, a large storage facility which will provide fast access to data is very expensive. So data processing machines have an intermediate storage facility which is smaller in size than the main storage unit but which provides very fast access for the execution unit. This intermediate storage facility, known as a buffer, holds the blocks of data on which the execution unit is operating and allows the execution unit to access the data it needs very quickly. The content of the buffer is continually updated to try to keep available data which the program currently executing in the execution unit needs. If the execution unit calls for data which is not resident in the buffer, then the buffer must retrieve the data from the mainstore for presentation to the execution unit and move out inactive data from the buffer to make room for the data. In a multiprogramming environment, the data which is moved out of the buffer is not necessarily associated with the program which requires space in the buffer.

Along with the need by the execution unit for fast access to data comes the need to assure that the data resulting from operations by the execution unit and stored in the storage facilities is correct. Consequently, the buffer storage facility and the main storage facility typically have error checking and correcting units for detecting errors that may occur in the data while it is resident in the respective storage facility. Likewise, when the execution unit performs an operation on data and desires to move that data back to the storage facility, the resulting data also is checked for errors that may occur during the transfer of the data or during operations in the execution unit. Errors can occur intermittently due to failures of memory devices, electrical contacts, and other reasons.

The error checking that occurs when data is moved from the execution unit into the buffer storage facility introduces a time consuming step in the transfer of data between the execution unit and the buffer, which degrades access of the execution unit to the buffer.

In a multiprogramming environment, the error checking which occurs on the transfer of data from the execution unit to the buffer normally detects errors before the data moves into the buffer in order to confine the damage to the program with which erroneous data is associated. If the erroneous data became stored in the buffer before the error was detected, there would be a chance that during the execution of an unrelated program, the buffer would move the erroneous data out and that the data would be subsequently accessed by an unrelated program. Thus, the error checking normally occurs before the data moves into the buffer, so that other programs will not be damaged by the erroneous data.

Thus, there is a need for an apparatus for deferring the error checking that occurs as data is moved from the execution unit to the buffer in order to speed up the access time between the execution unit and the buffer, but also to confine the damage caused by errors to the program with which the erroneous data is associated.

SUMMARY OF THE INVENTION

The present invention is an apparatus for permitting a data processing machine to store data that is delivered from the execution unit of the data processing machine to the buffer storage facility before completing the error checking steps and thereby speeding up the access of the execution unit to the buffer. The apparatus of the present invention includes in a data processing system an execution unit which performs operations on data presented to it by a first storage unit, such as fast access storage facility or buffer. Associated with the execution unit is a result register or other means for latching execution unit data which results from operations performed by the execution unit on data. Further included is an execution result checking unit which checks the execution unit data for errors and generates a bad data signal when the execution unit data contains an error upon transfer from the result register to the first storage unit.

In communication with the first storage unit is a second storage unit, such as a large capacity main storage facility, to which data from the first storage unit can be transferred and vice versa. Associated with the second storage unit is an error checking unit which checks for errors in data upon move-out of the data from the second storage unit. If the data in the second storage unit upon move-out contains an uncorrectable error then the error checking unit generates an error condition which recognizes the program that calls for the data.

The present invention further includes a bad data signal processing unit which receives the bad data signal generated by the execution result checking unit when an error is detected in data upon transfer from the execution unit to the first storage unit. Upon receipt of the bad data signal, the bad data signal processing unit generates an error release signal which causes the execution unit data to be moved out of the first storage unit into second storage unit, and forces the error checking unit associated with the second storage unit to recognize the execution unit data as containing an error.

Upon move-out of the data from the second storage unit or mainstore, an error condition is generated.

Thus, the present invention provides an apparatus whereby data can be transferred from the execution unit to the buffer before the error checking has been completed upon the data as it is transferred. If the data contains an error, the present invention further provides that the error is detected and the data is transferred to the main storage facility where a further error condition will be generated when a program associated with the data calls for the data to be moved out of the mainstore. Because the identity of the programs with which the data is associated is preserved, the present invention enhances the speed of access to the buffer by the execution unit without sacrificing the error isolation ability of the data processing machine.

DETAILED DESCRIPTION

With reference to the drawings, detailed description of the preferred embodiment of the present invention is provided.

Figure 1:
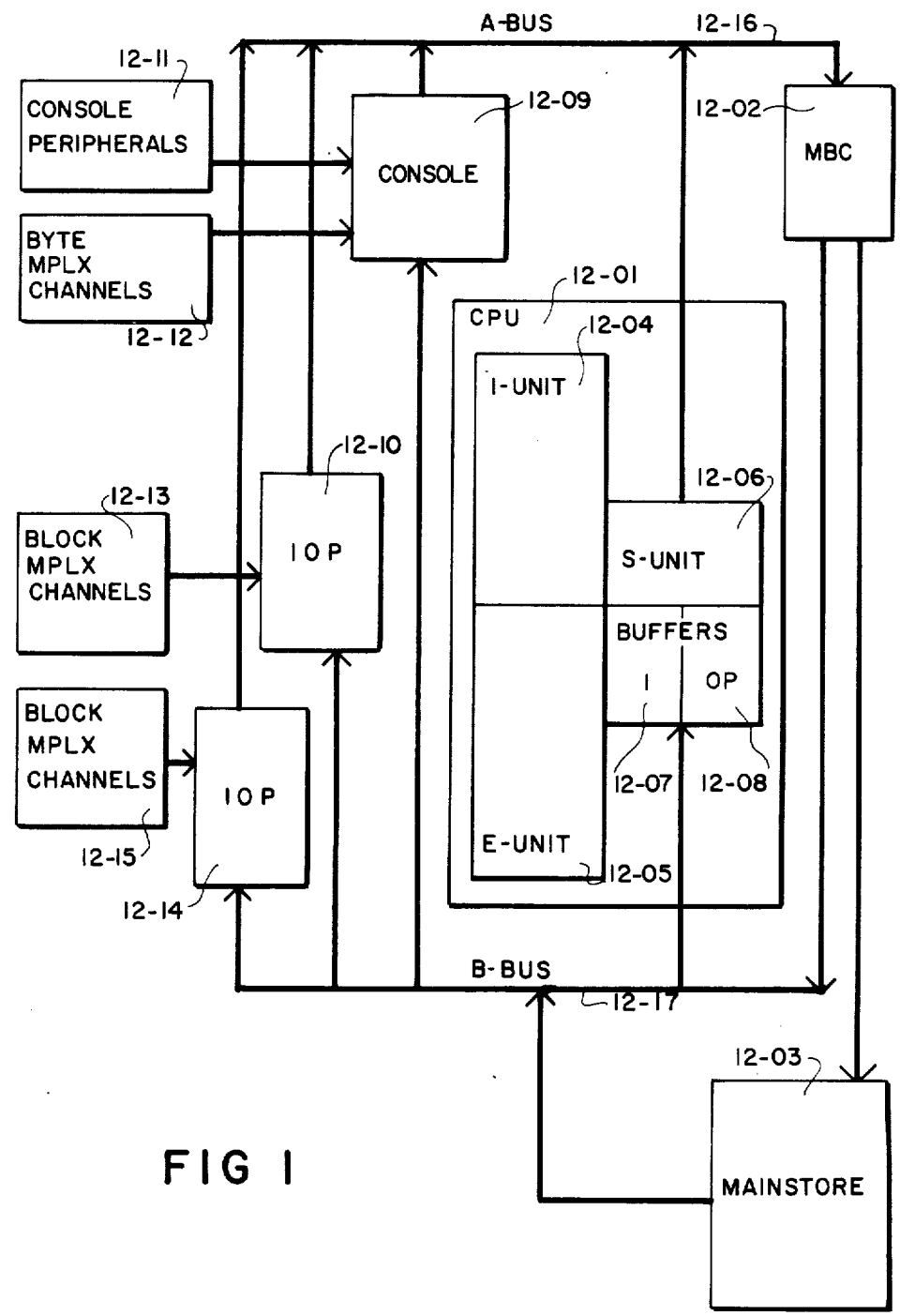
FIG. 1 is a system overview block diagram of a data processing machine that includes the present invention.

FIG. 1 shows a block diagram of a system overview of the data processing machine which employs the present invention. The present invention is most closely associated with the central processing unit 12-01, the memory bus controller 12-02, and a main storage unit 12-03. The central processing unit 12-01 includes five subparts as follows: the instruction unit 12-04 (I-UNIT) which fetches, decodes, and controls instructions and controls the central processing unit; the execution unit 12-05 (E-UNIT) which provides computational facilities for the data processing machine; the storage unit 12-06 (S-UNIT) which controls the data processing machines instruction and operand storage and retrieval facilities; the instruction buffer 12-07 which provides high-speed buffer storage for instruction streams; and the operand buffer 12-08 which provides high-speed buffer storage for operand data.

Other major parts of a data processing machine as shown in FIG. 1 include the input-output processor (IOP) 12-10 which receives and processes input-output requests from the central processing unit 12-01 and provides block multiplexer channels; the console 12-09 which communicates with the central processing unit 12-01 to provide system control and byte multiplexer channels, the memory bus controller (MBC) 12-02 which provides main memory and bus control, system wide coordination of functions and timing facilities; and, the main storage unit 12-03 which provides system large capacity memory. A second input-output processor 12-14 and additional multiplexer channels 12-15 may be included as shown in FIG. 1.

The data processing system shown in FIG. 1 employes a dual bus structure: The A bus 12-16 and the B bus 12-17. The A bus 12-16 carries data from the console 12-09, the input-output processor 12-10, and the central processing unit 12-01 to the memory bus controller 12-02. The B bus 12-17 carries data from the memory bus controller 12-02 and the main storage unit 12-03 to the console 12-09, the input-output processor 12-10 and the central processing unit 12-01.

For a more detailed description of the system overview shown in FIG. 1 refer to the related application entitled VIRTUALLY ADDRESSED CACHE invented by Gene Myron Amdahl, Donald Laverne Hanson and Gary Arthur Woffinden filed contemporaneously herewith and owned by a common assignee.

As described above in the Summary of the Invention, the present invention is concerned with speeding up the access of the E-Unit 12-05 to the high speed operand buffer 12-08. The speed of access of the E-Unit 12-05 to high speed data buffer 12-08 is enhanced by altering the mechanism for checking for errors in the data.

The present invention may be described with reference to the simplified data path flow diagram shown in FIG. 2. Access to the high speed buffer 12-08 by the E-Unit 12-05 is enhanced by altering the E-Unit result checking path 12-38, so that it completes its function in parallel with the store of data following the result register data path 12-26 to the high speed buffer 12-08. The novel mechanism of the present invention can be described starting with the E-Unit 12-05 where an operation has occurred upon a block of data that must be read back to the buffer 12-08 for storage. The block of data is presented by the E-Unit 12-05 to an E-Unit result register 12-37. From the E-Unit result register 12-37 the data word is immediately written over to the high speed buffer 12-08 across the result register data path 12-26. At the same time the E-Unit result checking process 12-33 occurs.

The E-Unit result checking 12-33 can be of a variety of types including what is known as residue checking, and what is known as parity checking, or both. The type used is not important to the present invention. However, if the E-Unit result checking unit 12-33 detects that an error occurred in the data as presented by the E-Unit 12-05 to the high speed buffer 12-08 then a signal is delivered to the bad data processing unit 12-34. The bad data processing unit 12-34 then initiates an error release signal 12-35 which causes the data which has been written into the high speed buffer 12-08 to be moved out of the buffer 12-08 into the mainstore 12-03. Simultaneously the bad data processing unit 12-34 sends a bad data signal 12-36 to the mainstore error checking unit 12-30. The error checking unit 12-27 associated with the operand buffer 12-08 will not detect an error that occurred in the data as it moved over from the E-Unit 12-05 through the E-Unit result register 12-37 because the operand checking unit 12-27 will see the data as the same on both the move-in of the data to the buffer 12-08 and on the move-out from the buffer 12-08. Note, however, that if the error which occurs upon transfer to the buffer 12-08 is a single bit error that occurred after parity is generated, the error checking unit 12-27 associated with the buffer 12-08 will detect a false error in the parity bit and change the parity bit to correspond to the erroneous data.

When the data is moved out of the buffer 12-08 in response to the error release signal 12-35 and stored into the mainstore 12-03, the mainstore error checking unit 12-30 will store the data in response to the bad data signal 12-36 with an error checking code that flags the data as containing an error. Thus on a subsequent request for the data by a program with which the data is associated, an error condition is caused which will generate a machine check 12-74.

In the preferred embodiment, the error release signal 12-35 also generates a machine check, but the machine check algorithm simply logs the event without interrupting the machine. However this is simply a diagnostic tool not important to the present invention.

Figure 2:
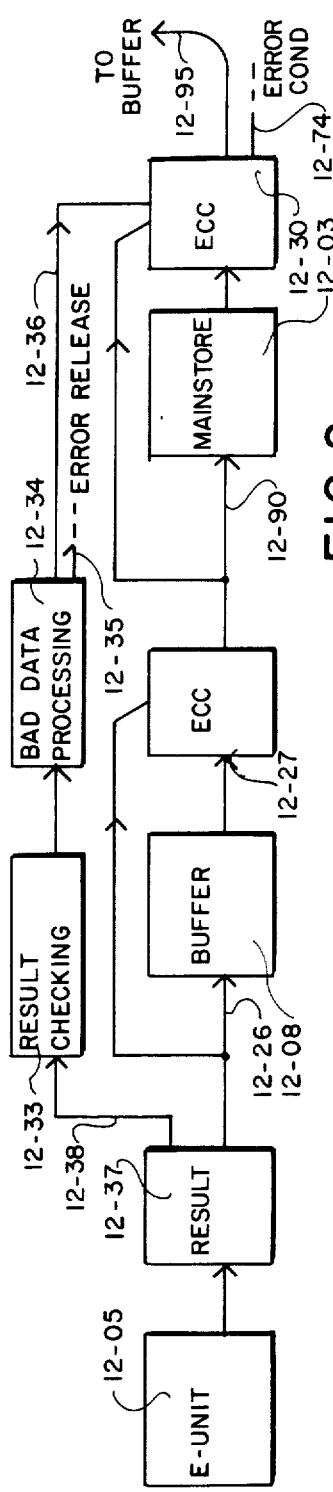
FIG. 2 is a simplified block diagram of the data path of the present invention.

Thus, according to the present invention, as can be seen with reference to FIG. 2, the present invention provides faster access to the operand buffer 12-08 for the E-Unit 12-05 by providing a novel mechanism for deferring the checking of the E-Unit results for errors. Further, the damage caused by the data containing an error upon move-out from the E-Unit 12-05 to the buffer 12-08 will be confined by forcing the data to be moved with an error signal into the mainstore 12-03 where the mainstore error checking unit 12-30 will recognize the error when the data is called up by a program with which the data is associated.

Figure 3:
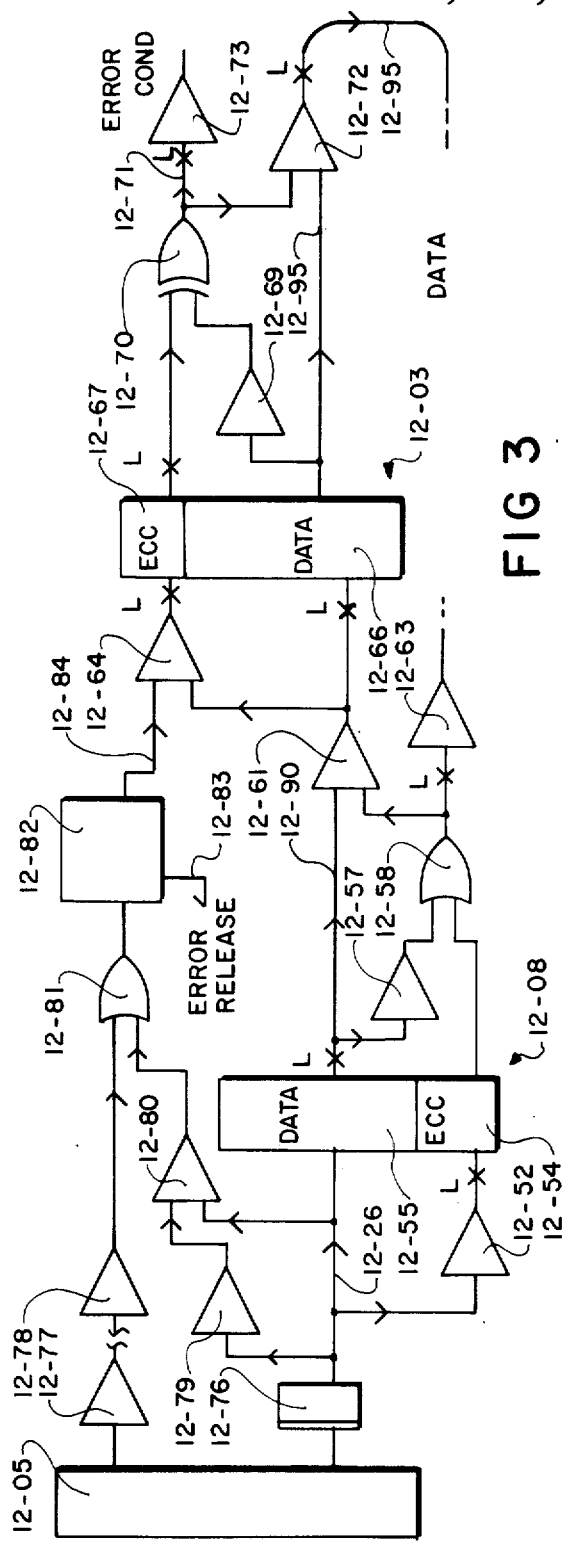
FIG. 3 is an expanded block diagram of the data path of the preferred embodiment of the present invention.

A more detailed schematic data path showing the present invention is depicted in FIG. 3. The physical parts of the present invention are distributed across the execution unit 12-05, the S-Unit 12-06, the MBC 12-02, and back to the S-Unit 12-06. However, the parts may be arranged as desired by the user. The present invention is concerned primarily with improving the access of the E-Unit 12-05 to the high speed buffer 12-08 for operands. It further involves the transfer of data between the high speed buffer 12-08 and the mainstore 12-03.

As mentioned above, the E-Unit 12-05 performs operations on data presented to it by the high speed operand buffer 12-08 across a data path (not shown). After the execution unit 12-05 has operated upon the data, it is transferred across the data line 12-26 back to the high speed buffer 12-08 where it remains until being forced out into the mainstore 12-03, for example in the case of an overflow of the buffer 12-08, or is otherwise operated upon. As shown in FIG. 3, E-Unit 12-05 presents its data to the result register 12-76. The data from the result register 12-76 is then moved into the data portion 12-55 of the high speed buffer 12-08.

Before the E-Unit 12-05 operates on the data, a residue generator 12-77 generates a residue for the data. After the results of a given operation are written into the E-Unit result register 12-76 a residue checker 12-78 then checks the result of the operation on the data according to a well known algorithm. (See, *Residue Arithmetic and Its Applications to Computer Technology*, Nicholas S. Szabo, Richard I. Tanaka. (McGraw-Hill, 1967)) The drawing in FIG. 3 is only meant to indicate the presence of a residue checking mechanism, not the function.

Likewise in the preferred embodiment, an E-Unit parity bit is generated at the parity generator 12-79 located in the E-Unit. The E-Unit parity bit and the results of the residue check are then transferred across the unit boundary from the E-Unit 12-05 to the S-Unit 12-06 where the data, as received by the S-Unit 12-06, enters an S-Unit parity checker 12-80 where the S-Unit parity is compared with the E-Unit parity bit delivered from the E-unit 12-05. The results of the residue check and the results of the parity check are then presented to the OR gate 12-81. If either of the error checking mechanisms discovers an error, then the bad data analysis unit 12-82 is signaled. By the time the bad data analysis unit 12-82 receives the signal that the error checking mechanism have discovered an error in the data presented by the execution unit register 12-76, the data from the execution unit result register 12-76 is written into the high speed operand buffer 12-08. For clarity, the data written into high speed buffer 12-08 from the execution unit result register 12-76 will be called execution unit data.

In the preferred embodiment associated with the high speed buffer 12-08 is an error checking and correcting (ECC) system as shown in FIG. 3. As the execution unit data is written into the high speed buffer 12-08, an operand ECC code is generated at the operand ECC code generator 12-52. The operand ECC code is then stored in the ECC code portion 12-54 of the high speed buffer 12-08. Because the operand ECC code mechanism is designed to detect errors that occur while the data is resident in the buffer 12-08, the mechanism will not detect that the data presented from the E-Unit result register 12-76 contained an error. So assuming that no error occurs in the data while it is resident in the high speed buffer 12-08, the operand move-out ECC code generator 12-57 will generate the same ECC code as was generated upon move-in of the data. In the preferred embodiment, the operand ECC code generated upon move-out of the data from the operand buffer is exclusive ORed at the gate 12-58 with the ECC code that was generated upon move-in producing a syndrome which will indicate whether errors occurred in the data while resident in the operand buffer 12-08. The syndrome generated, if no errors occurred, will signal the correct data unit 12-61 that correct data is being presented across the data line 12-51. If an uncorrectable error occurs while the data is resident in the buffer 12-08, then the syndrome will activate the uncorrectable error processing unit 12-63. For details of the uncorrectable error processing 12-67 associated with the buffer 12-08, see the related application entitled APPARATUS FOR STORING DATA WITH DEFERRED UNCORRECTABLE ERROR REPORTING invented by Gary Arthur Woffinden and Joseph Anthony Petolino, Jr., filed contemporaneously herewith and owned by a common assignee. The uncorrectable error processing described in the related application is completely compatible with the present invention.

Returning to the situation in which an error was detected by the result checking mechanism associated with the E-unit 12-05 in the execution unit data which has been written into the high speed buffer 12-08, the bad data analysis unit will have received an error signal from the OR-gate 12-81. Upon receipt of the error signal from the OR-gate 12-81, the bad data analysis unit 12-82 will initiate the error release system by sending an error release signal 12-83 to control logic (not shown) which will force the execution unit data containing an error to be moved out of the high speed buffer 12-08 and into the mainstore 12-03 along data line 12-90. As described above the error checking and correcting mechanism associated with the operand buffer 12-08 will not have detected the error in the execution unit data, so the data will be presented from the correct data logic unit 12-61 in its unaltered form, still containing an error. Thus the data moved into the data portion 12-66 of the mainstore 12-03 will contain the error that was detected by either the residue checking mechanism 12-77, 12-78 or the parity checking mechanism 12-79, 12-80 upon transfer from the execution unit 12-05 to the high speed buffer 12-08.

The bad data analysis unit 12-82 having received an error signal from the OR-gate 12-81 will, at the same time as issuing an error release signal 12-83, issue a bad data signal to the mainstore error checking and correcting (ECC) code generator 12-64. As the data is moved into the mainstore 12-03, the mainstore ECC code generator 12-64 will calculate an ECC code in response to both execution unit data containing the error and the bad data signal 12-84 indicating that the data being written into the mainstore 12-03 contains an error.

Thus, at the mainstore ECC code is written into the ECC code portion 12-66 of the mainstore 12-03, the ECC code will assume a state indicating that erroneous data is being stored.

Upon a subsequent request for the data by the program with which the data is associated, the mainstore move-out ECC code generator 12-69 will receive the execution unit data containing an error and generate an ECC code associated with the data. That ECC code will be exclusive-ORed at the gate 12-70 with the special ECC code which was stored in the ECC portion 12-67 of the mainstore upon move-in of the data. The syndrome 12-71 which is produced at the exclusive-OR gate 12-70 will be presented to the mainstore error analysis unit 12-73 which will detect that the data contained an error when it was written into the mainstore 12-03. Thus an error condition 12-74 will be signalled generating a machine check.

The correct data unit 12-72 will be unable to correct the data as indicated by the syndrome 12-71 which is delivered to the correct data unit 12-72 and the mainstore error analysis unit 12-74. Thus, when the data is moved out along the data line 12-95 back to the buffer 12-08, the machine check will occur confining the damage to the harmed program. For more details of the error checking and correcting mechanism used by the mainstore 12-03 and high speed buffer 12-08, refer to the related applications entitled APPARATUS FOR STORING DATA WITH DEFERRED UNCORRECTABLE ERROR REPORTING and the APPARATUS FOR REDUCING STORAGE NECESSARY FOR ERROR CORRECTION AND DETECTION IN DATA PROCESSING MACHINES invented by Gary Arthur Woffinden and Joseph Anthony Petolino, Jr., filed contemporaneously herewith and owned by a common assignee.

From the foregoing, it can seen that the access of the execution unit 12-05 to the high speed buffer 12-08 is enhanced by deferring the step of checking the data for errors detected by the result checking mechanisms associated with the E-Unit 12-05 until after the data has been stored into the high speed buffer 12-08. If no error is detected by the execution unit error checking mechanisms, then the machine proceeds without interruption and the data is quickly moved-out of the E-Unit result register, making it available for subsequent operations. However, if an error occurs, the erroneous data in the buffer 12-08 will be accessible for processing but not recognizable as bad data. This problem is solved by the bad data analysis unit 12-82. The bad data analysis unit 12-82 causes an error release signal 12-83 which forces the erroneous execution unit data to be moved out to the mainstore 12-03. Along with the move-out of the data, a bad data signal 12-84 is generated and received by the mainstore ECC code generator 12-64 which flags the data as containing an error which was generated before the data moved into the mainstore 12-03. Thus the data is moved out of the high speed buffer 12-08 (before being forced out by a possibly unrelated program). Rather it is moved into the mainstore 12-03 where it will stay until it is called for by a program with which it is associated. Thus the error condition 12-74 which is generated by the error originating in E-Unit 12-05 will occur when a program with which the data is associated calls for the data. Thus during the machine check the harm caused by the erroneous data and will be confined to the programs with which it is associated.

In the preferred embodiment, it is possible that another program will access the erroneous E-unit data causing it to be moved out of the buffer 12-08 before the error release is completed. If the data has been moved out before the bad data processing unit 12-34 completes the error release, the machine check which logs the error detection will lead to an error condition that fails to confine the damage to a program with which the error is associated. However, this event occurs very infrequently.

The logic circuitry and the high speed buffers 12-09, 12-08 of the preferred embodiment are implemented with emitter coupled logic (ECL). The mainstore 12-03 is implemented with dynamic MOS technology. Note that other data processing circuitry and storage technologies may be used without detraction from the present invention.

Further, in order to simplify the description, the latch points in the figures have been left out. However, latches occur in the circuitry at points necessary according to the timing of the particular machine. For example, typical latch points L occur as indicated in FIG. 3.

While the invention has been particularly shown and described with reference to the preferred embodiments thereof, it will be understood by those skilled in the art that various changes in the form and detail may be made therein without departing from the spirit and scope of the invention.

We claim:

1. In a data processing system, an apparatus for storing and detecting erroneous data, comprising:

execution unit means for performing operations on data and creating execution unit data which is the result of said operations;

first storage means in communication with said execution unit means for storing said execution unit data;

second storage means in communication with said first storage means so that data can be moved out from said first storage means into said second storage means;

execution result checking means connected to the execution unit means in parallel with said first storage means for checking said execution unit data for error;

means for generating a bad data signal when said execution unit data contains an error;

a bad data signal processing means, connected to receive said bad data signal, for causing said erroneous execution unit data to move out from said first storage means into said second storage means and for causing said execution unit data to be stored with an error indication; and error checking means connected to said second storage means upon move-out of said execution unit data from said second storage means for detecting said error indication and for generating an error signal when said error indication is detected.

2. The apparatus of claim 1, wherein:

said first storage means provides high speed buffer storage for fast access to data by said execution unit means; and said second storage means provides large capacity memory for data processing system.

3. The apparatus of claim 1, wherein said apparatus includes:

means, connected to said execution unit means, for generating a residue code from said execution unit data and wherein said execution result checking means includes means for checking said residue code for said execution unit data to detect a residue error as said execution unit data is being stored into said first storage means and to generate said bad data signal when a residue error is detected.

4. The apparatus of claim 1, wherein:

said execution result checking means includes means for generating a parity bit for said execution unit data when said execution unit data moves out from said execution unit means, and means for checking said parity bit when said execution unit data is transferred to said first storage means, whereby parity errors are detected.

5. The apparatus of claim 3 wherein said execution result checking means further includes:

means for generating a parity bit for said execution unit data when said execution unit data moves out from said execution unit means, and means for checking said parity bit when said execution unit data is transferred to said first storage means, whereby parity errors are detected; and means for generating said bad data signal when either a residue error of a parity error, or both, are detected.

* * * * *